US012124639B2

(12) United States Patent
Rappaport et al.

(10) Patent No.: US 12,124,639 B2
(45) Date of Patent: Oct. 22, 2024

(54) MODULAR ACCESSIBILITY GRIPS FOR DIGITAL WRITING UTENSIL

(71) Applicant: Microsoft Technology Licensing, LLC, Redmond, WA (US)

(72) Inventors: David Justin Rappaport, San Francisco, CA (US); Erica Lynn Arnold, Arcata, CA (US); Gabrielle DeAnne Michel, Snohomish, WA (US); Rhishikesh A. Sathe, Bothell, WA (US); Lalit Anil Palve, Vancouver (CA); Cameron Delaney Foster, Seattle, WA (US); Julia Caroline Chamberlain, Bainbridge, WA (US); Adele Fishbein Druck, Englewood, NJ (US); Alexander Norman Bennett, Seattle, WA (US); Aditha May Adams, Seattle, WA (US); David George Dame, Waterloo (CA); Daniel Smitasin, Pasadena, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 39 days.

(21) Appl. No.: 17/843,149

(22) Filed: Jun. 17, 2022

(65) Prior Publication Data

US 2023/0409127 A1    Dec. 21, 2023

(51) Int. Cl.
*G06F 3/0354*    (2013.01)
*G05G 9/047*    (2006.01)

(52) U.S. Cl.
CPC ......... *G06F 3/03545* (2013.01); *G05G 9/047* (2013.01)

(58) Field of Classification Search
CPC .... B43K 23/00; B43K 23/004; B43K 24/082; G06F 3/03545
See application file for complete search history.

(56) References Cited

U.S. PATENT DOCUMENTS

| | | | | |
|---|---|---|---|---|
| 5,772,345 | A * | 6/1998 | Simonds | B43K 23/016 211/69.5 |
| 10,664,069 | B1 * | 5/2020 | Lee | G06F 3/03545 |
| 2011/0038659 | A1 * | 2/2011 | Andochick | B43K 21/08 401/48 |
| 2021/0181867 | A1 * | 6/2021 | Stancil | G06F 3/04883 |

OTHER PUBLICATIONS

"Ergo Wacom Pen Installation Instructions", Retrieved From: https://web.archive.org/web/20171011094732/http://www.plusergogrips.com/instructions, Oct. 11, 2017, 3 Pages.
"Plus Ergo Grips for Wacom", Retrieved From: https://web.archive.org/web/20170421095016/http://www.plusergogrips.com/wacom, Apr. 21, 2017, 4 Pages.
"International Search Report and Written Opinion Issued in PCT Application No. PCT/US23/021792", Mailed Date: Aug. 3, 2023, 11 Pages.

* cited by examiner

*Primary Examiner* — David P Angwin
*Assistant Examiner* — Bradley S Oliver
(74) *Attorney, Agent, or Firm* — RAY QUINNEY & NEBEKER P.C.; Paul N. Taylor

(57) ABSTRACT

An adaptive grip for a digital stylus includes a body having an internal volume and a keying feature in the internal volume to rotationally key the digital stylus to the body. The adaptive grip further includes a distal opening to allow an inking tip of the digital stylus to protrude from the internal volume and a retention feature to retain the digital stylus in the internal volume in a longitudinal direction.

15 Claims, 9 Drawing Sheets

MODULAR ACCESSIBILITY GRIPS FOR DIGITAL WRITING UTENSIL

BACKGROUND

Background and Relevant Art

Adaptive peripherals and game controllers can provide individuals with limited or different mobility the ability to engage with software applications. For example, adaptive peripherals can allow an individual with limited manual mobility to engage with a touchscreen and digital stylus that conventionally require extensive manual dexterity. As the mobility and abilities of individuals can vary greatly, many conventional adaptive peripherals are custom-made to the individual by hand and can be prohibitively expensive.

BRIEF SUMMARY

In some embodiments, an adaptive grip for a digital stylus includes a body having an internal volume and a keying feature in the internal volume to rotationally key the digital stylus to the body. The adaptive grip further includes a distal opening to allow an inking tip of the digital stylus to protrude from the internal volume and a retention feature to retain the digital stylus in the internal volume in a longitudinal direction.

In some embodiments, a method of manufacturing an adaptive grip for a digital stylus includes obtaining a model of an adaptive grip, the model having a plurality of components including at least a body configured to receive the digital stylus; identifying one or more fit components of the model; identifying one or more functional components of the model; receiving at least one change to the model; based at least partially on the at least one change, changing at least one property of a fit component of the one or more fit components without altering a functional component of the plurality of components; and providing at least an altered fit component to an additive manufacturing device.

In some embodiments, a system for providing inputs to an electronic device includes an adaptive grip and a digital stylus. The adaptive grip includes a body having an internal volume and a keying feature in the internal volume to rotationally key the digital stylus to the body. The adaptive grip further includes a distal opening to allow an inking tip of the digital stylus to protrude from the internal volume and a retention feature to retain the digital stylus in the internal volume in a longitudinal direction. The adaptive grip further includes a movable transmission feature having a contact surface on a transmission member. The digital stylus is positioned in the internal volume of the adaptive grip and includes an input button on a transverse side of the digital stylus, and the input button is rotationally and longitudinally aligned with a portion of the transmission member.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a side cross-sectional view of the digital stylus and an adaptive grip of FIG. 1-1, according to at least some embodiments of the present disclosure;

FIG. 2 is a side cross-sectional view of an adaptive grip and digital stylus, according to at least some embodiments of the present disclosure;

FIG. 4-1 through FIG. 4-3 illustrate different methods of altering a property of a component of a model, according to at least some embodiments of the present disclosure;

DETAILED DESCRIPTION

Figure 1:
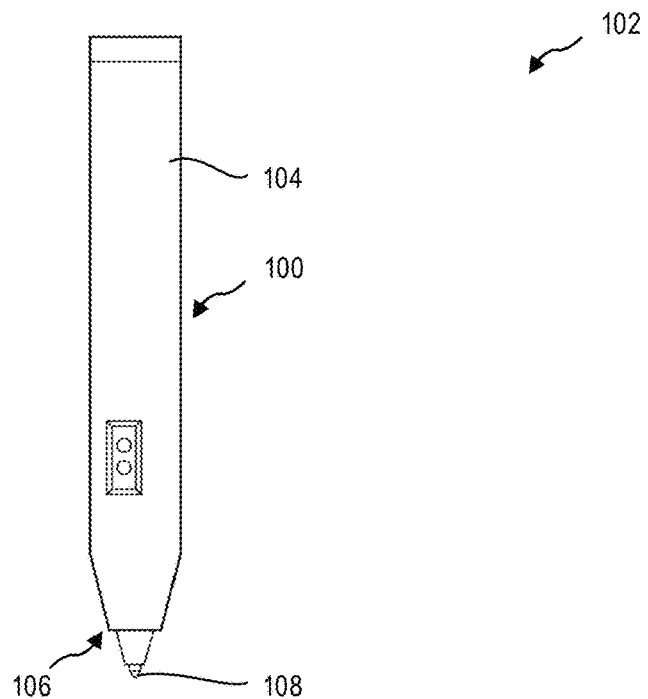
FIG. 1-1 is a side view of a digital stylus and an adaptive grip, according to at least some embodiments of the present disclosure.

The present disclosure generally relates to systems and methods for manufacturing at least part of a peripheral for an electronic device. More particularly, systems and methods described herein allow for manufacturing of a customized adaptive peripheral for use with electronic devices.

In some embodiments, systems and methods according to the present disclosure allow a user to customize one or more parts of a peripheral prior to manufacturing, such that the manufactured part(s) meet the user's needs while remaining interoperable with other components of the peripheral. Systems and methods according to the present disclosure may reduce costs and manufacturing time while improving comfort and performance of the manufactured adaptive peripherals.

Depending on a user's physical abilities, an adaptive peripheral for the user may require customized dimensions, weight, resistance, shape, material, texture, or color. Conventionally, a custom adaptive peripheral is commissioned and crafted by hand to the user's specifications. Newer manufacturing methods may use additive manufacturing or three-dimensional (3D) printing to rapidly produce a custom part to the user's specifications. However, modeling and designing the custom part for additive manufacturing conventionally requires computer assisted design (CAD) modeling software and experience using the CAD modeling software, which creates another barrier for users needing adaptive peripherals.

In some examples, adaptive grips for existing peripherals and/or accessories for electronic devices can interfere with or prevent the use of one or more functions of the peripherals and/or accessories. Embodiments of adaptive grips according to the present disclosure include one or more keying features to that interact with the peripheral or accessory to ensure the user can access or interact with functions of the peripheral or accessory. In at least one example, a keying feature on the adaptive grip allows the adaptive grip to align with a body of the peripheral or accessory to support or allow interaction with an input button of the peripheral or accessory when the adaptive grip is positioned on the peripheral or accessory.

In some embodiments, the adaptive grip includes a window through which an input button of the peripheral or accessory is accessible when the adaptive grip is positioned on the peripheral or accessory and the keying feature is engaged with a complementary keying feature on the peripheral or accessory. For example, a keying feature of the adaptive grip and a complementary keying feature on the peripheral or accessory may rotationally key the adaptive grip relative to the peripheral or accessory to align the window with the input button of the peripheral or accessory. The user may then engage with the input button through the window of the adaptive grip to access the associated function(s) of the input button.

In some embodiments, the adaptive grip includes a movable transmission feature configured to transmit an input through the adaptive grip to an input button of the peripheral or accessory when the adaptive grip is positioned on the peripheral or accessory and the keying feature is engaged with a complementary keying feature on the peripheral or accessory. For example, a keying feature of the adaptive grip and a complementary keying feature on the peripheral or accessory may rotationally key the adaptive grip relative to the peripheral or accessory to align the movable transmission feature with the input button of the peripheral or accessory. The user may then engage with the movable transmission feature of the adaptive grip to move at least a portion of the movable transmission feature and actuate the input button(s) of the adaptive grip. For example, an elastically deformable portion of the adaptive grip may allow the user to apply a force to the movable transmission feature to bend or depress the movable transmission feature, which transmits the force to the input button of the peripheral or accessory. When the user removes the force from the movable transmission feature, the movable transmission feature may elastically return to the original state, removing the force from the input button.

In some embodiments, the adaptive grip is customizable to user's needs. In some embodiments, the adaptive grip is manufactured by additive manufacturing (e.g., three-dimensional printing). Additive manufacturing can allow a user or technician to provide a CAD model to an additive manufacturing system and create the adaptive grip from a variety of materials. In some embodiments, a CAD model according to the present disclosure can include customizable portions of the CAD model and locked or non-customizable features to ensure compatibility and/or interoperability with the peripheral or accessory device.

In some embodiments, a base model of a peripheral is obtained, and a user provides changes to the base model that can be applied to one or more components of the model to allow the alterations to accommodate the user's needs while the parts remain interoperable and compatible with one another to simplify manufacturing and assembly. For example, an existing CAD model may include a plurality of components to the CAD model that are independently editable. In some embodiments, a system or method according to the present disclosure identifies at least one component of the plurality of components as a fit component, which is editable to the user for customization purposes, and identify at least one component as a functional component, which is non-editable or locked to the user for customization purposes. In at least one example, the user has the option to alter or customize the CAD model through a webpage or web portal by changing properties and/or values of the fit components, while the properties and/or values of the functional components remain locked.

In some embodiments, the keying feature of the adaptive grip, at least one dimension of the adaptive grip, a window, or a movable transmission feature are locked or non-editable functional components of the adaptive grip. FIG. 1-1 is a perspective view of a digital stylus 100 with an adaptive grip 102 thereon. In some embodiments, the adaptive grip 102 includes a body 104 with an internal volume configured to receive the digital stylus 100. The adaptive grip 102 has a distal opening 106 to allow an inking tip 108 of the digital stylus 100 to protrude from the internal volume and allow the digital stylus 100 to interact with a touch-sensitive device, such as a trackpad or touchscreen of another electronic device.

In some embodiments, the body 104 has an external shape, size, surface texture, surface material, etc. that assists a user with limited manual dexterity or strength to hold or manipulate the digital stylus 100. For example, the body 104 may have a greater thickness than the digital stylus 100. In other example, the body 104 may have a surface texture or protrusions that allow for a user to grip the adaptive grip 102. In various embodiments, the external dimensions of the adaptive grip 102 are customizable to the particular needs or preferences of the user, and the adaptive grip 102 may have any number of external shapes depending on the particular needs or preferences of the user.

Figures 1, 2:
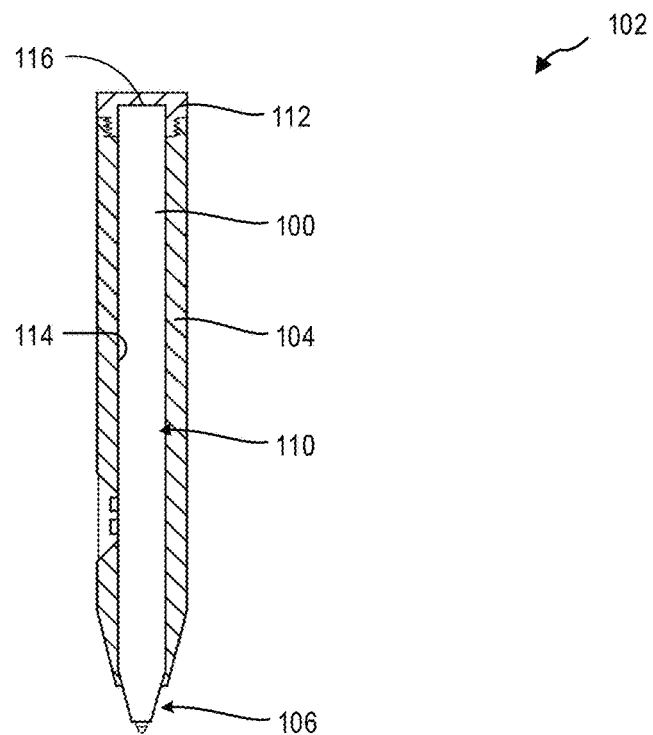
Figure 2:
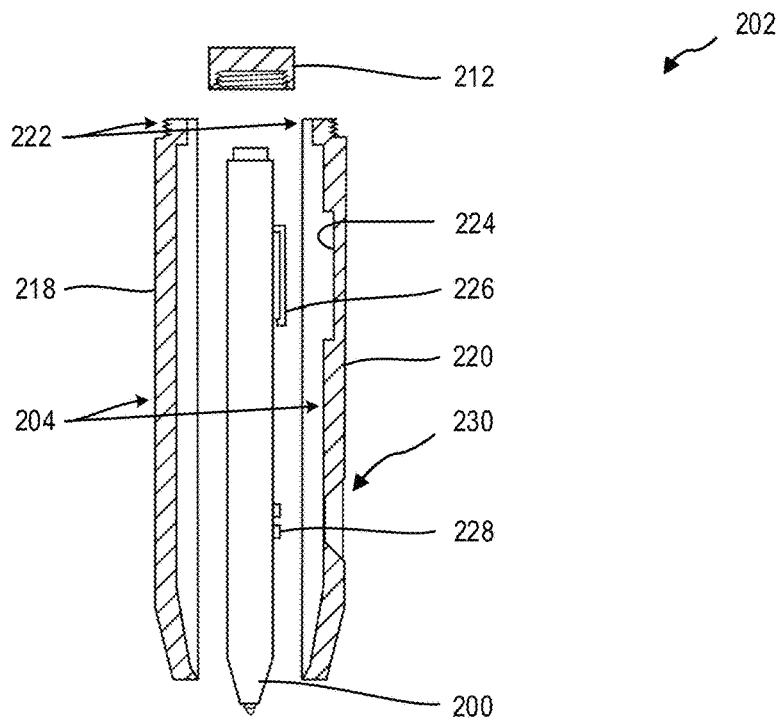

FIG. 1-2 is a longitudinal cross-sectional view of the embodiment of a digital stylus 100 and adaptive grip 102 of FIG. 1-1. As described herein, the adaptive grip 102 has an internal volume 110. In some embodiments, the internal volume 110 receives the digital stylus 100 in a longitudinal direction and a distal opening 106 of the body 104 is smaller than the digital stylus 100 to function as a retention feature and retain the digital stylus 100 in the distal direction along the longitudinal axis of the adaptive grip 102. For example, a removable cap 112 may be located opposite the distal opening 106. In some embodiments, the removable cap 112 may be a retention feature that is connectable to the body 104 to retain the digital stylus 100 in the internal volume 110 of the adaptive grip 102. In some embodiments, the removable cap 112 may be located at a distal end of the body and include the distal opening 106. For example, the digital stylus 100 may be inserted into the internal volume 110 from the distal end of the body 104 and the removable cap 112 may be connected to the body 104 to retain the digital stylus 100 in the internal volume 110.

In other embodiments, the adaptive grip 102 includes additional or other retention features in the body 104 and/or the removable cap 112. For example, an inner surface 114 of the body 104 (proximate the internal volume 110) may be a retention feature that provides a friction fit with the surface of the digital stylus 100 to retain or help retain the digital stylus 100 in the internal volume 110. In some embodiments, a friction fit between the body 104 and the digital stylus 100 allows the adaptive grip 102 to retain the digital stylus 100 in the internal volume 110 against the force of gravity, while a closed proximate end 116 of the body 104 is a retention feature that provides support against the compressive force (in the longitudinal direction) applied to the inking tip 108 during use.

FIG. 2 is an exploded view of another embodiment of an adaptive grip 202 configured for use with a digital stylus 200. In some embodiments, the adaptive grip 202 includes a body 204 with a first portion 218 and a second portion 220 that connect to one another around the digital stylus 200. In some embodiments, the adaptive grip 202 is formed by joining the first portion 218 and the second portion 220 without additional fasteners, such as via a snap fit, compression fit, friction fit, or combinations thereof. In some embodiments, the adaptive grip 202 is formed by joining the first portion 218 and the second portion 220 with at least one fastener, such as a screw, clip, clamp, pin, or other fastener that applies a force to hold the first portion 218 and second portion 220 in contact with one another and/or in position on the digital stylus 200.

In some embodiments, the first portion 218 and second portion 220 may be further held in contact with one another and/or in position on the digital stylus 200 by a removable cap 212. For example, the first portion 218 and second portion 220 may, when positioned in contact with one another, form a threaded portion 222 or other connection mechanism to which the removable cap 212 may connect through a complementary connection mechanism. The removable cap 212 may, thereby, provide a compression force or otherwise limit the movement of the first portion 218 and second portion 220 relative to one another.

In some embodiments, the retention feature(s) of the adaptive grip 202 limits and/or prevents longitudinal movement of the digital stylus 200 relative to the adaptive grip 202. In some embodiments, the adaptive grip 202 further includes at least one keying feature 224 that interacts with a portion of the digital stylus 200 to limit and/or prevent rotational movement of the digital stylus 200 relative to the adaptive grip 202. In some embodiments, the digital stylus 200 includes a tail clip 226 or other non-rotationally symmetric element that engages with the keying feature 224 to key the digital stylus 200 rotationally relative to the adaptive grip 202.

In some embodiments, the tail clip 226 is rotationally aligned on the digital stylus 200 with one or more input buttons 228. In some embodiments, the tail clip 226 is not rotationally aligned on the digital stylus 200 with one or more input buttons 228 but is rotationally fixed relative to one or more input buttons 228 such that the input buttons 228 are rotationally located at a known position relative to the tail clip 226. The position of the tail clip 226 relative to the input buttons 228 may be used to key a position of a window 230 or movable transmission feature to the input buttons 228. For example, the keying feature 224 (such as a recess that receives the tail clip 226) may key the body 204 of the adaptive grip 202 to the digital stylus 200 such that the window 230 aligns with the input buttons 228 to allow access to the input buttons 228.

In another example, the window 230 may be the keying feature. For example, the input buttons 228 may protrude into and/or through window 230 to limit and/or prevent rotation of the digital stylus 200 relative to the adaptive grip 202. However, contact between the input buttons 228 and the body 204 of the adaptive grip 202 may be undesirable, as the contact may limit or prevent the user from providing inputs to the input buttons 228 or may cause unintended inputs to the input buttons 228. In some embodiments, therefore, it is desirable to have a keying feature that engages with a portion of the digital stylus that is not an input button.

Figure 3:
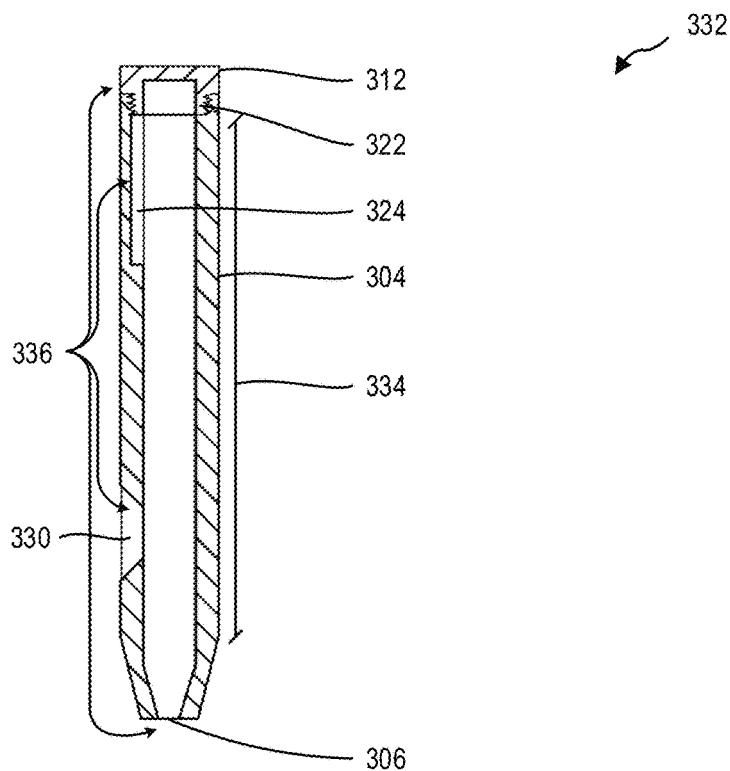
FIG. 3 is a cross-sectional view of a model of an adaptive grip, according to at least some embodiments of the present disclosure.

As described herein, the external shape or materials may be customizable based at least partially on particular needs or preferences of the user. FIG. 3 is an embodiment of a CAD model 332 (e.g., javascript computer assisted design (JSCAD), .stl format, .stp format, or other open-source or propriety format) of an adaptive grip, such as any of the embodiments of adaptive grips described herein. The model 332 includes and/or represents a plurality of components in the adaptive grip. In some embodiments, the plurality of components includes fit components 334 and functional components 336. The functional components 336 include any component or part of the model 332 that includes a connection interface with another component or a mechanical or electrical interface to receive an input to the peripheral. In some embodiments, the fit components 334 include any remaining portion of the CAD model 332 that is not a functional component 336.

In some embodiments, the fit components 334 include a body 304 or a removable cap 312, or other portion of the model 332 that corresponds to a contact surface or other surface of the adaptive grip that a user may touch during use. The fit components 334 may be editable to alter one or more properties or values to improve the comfort or performance of the adaptive grip for the user. For example, increasing a thickness of the body 304 increase the precision with which a user can control the inking tip of the digital stylus, reducing fatigue and improving comfort. In another example, decreasing the thickness of the body 304 may reduce a depth of the window 330, which may improve comfort for the user providing input to the digital stylus.

In some embodiments, the editable properties or values of the fit component 334 of a model 332 include any of length, width, height, thickness, perimeter shape (such as a planview or cross-sectional view shape), color, texture, or material. In some embodiments, the material may be changed or selected based on one or more desired material properties, such as a coefficient of friction (such as to improve grip on the adaptive grip), an elastic modulus (such as for a movable transmission feature, as will be described in more detail herein), or a vibration damping property. For example, a model may include a plurality of available materials and a user selection of a coefficient of friction may cause the material assigned to the fit component to change in the model to approximate or match the desired coefficient of friction. In another example, a model may include a plurality of available materials and a user selection of a compressibility of the adaptive grip may cause the material assigned to the fit component to change in the model to approximate or match a desired elastic modulus.

The model 332 may include a value or characteristic associated with each component of the model that designates the component as either a functional component or a fit component. For example, a model 332 may include discrete components within the model 332 that combine to form the complete model 332 of the adaptive grip. In some embodiments, a model 332 according to the present disclosure allows for subcomponents of a single component, where each subcomponent may be designated a fit component or a functional component.

In some embodiments, the model 332 includes at least a body 304 that includes both fit components 334 and functional components 336. In some embodiments, at least one fit component 334 or functional component 336 is subcomponent of another component. For example, in the illustrated embodiment, the body 304 includes a portion that includes a threaded portion 322 that is a functional component 336, a second portion that includes a keying feature 324, where the keying feature 324 is also a functional component 336. The functional components 336 have at least dimensions or other properties that become locked or non-editable in the model properties to ensure the functional components 336 continue to be interoperable with other functional components 336 of the model 332 and/or a digital stylus.

In some embodiments, the functional components include a movable transmission feature, a window 330, a distal opening 306, a keying feature 324, a connection interface such as a threaded portion 322, or other components or subcomponents that allow interaction with a portion of the digital stylus or connect a part of the adaptive grip to another part of the adaptive grip or to the digital stylus. For example, the window 330 of the adaptive grip 302 is designated as a functional component 336 to ensure the window 330 is properly located and sized to allow interactions with an input button while other properties of the body 304 (e.g., length, thickness, material) remain customizable. In some embodiments, editable properties or values of the functional components 336 include color or other properties that will not alter the function, size, or shape of the functional components 336.

Figures 1, 4:
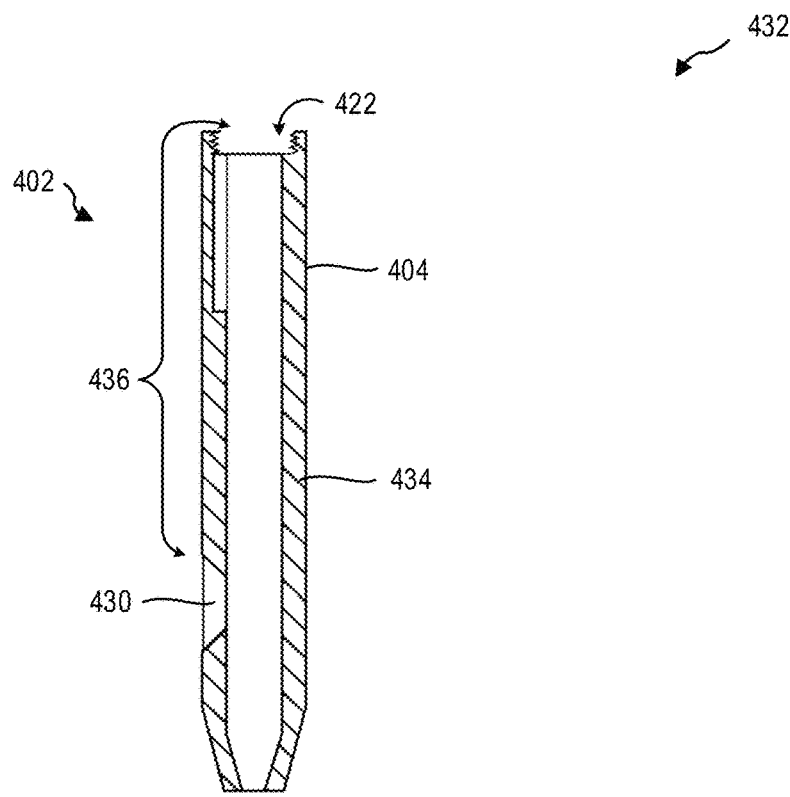
Figures 2, 4:
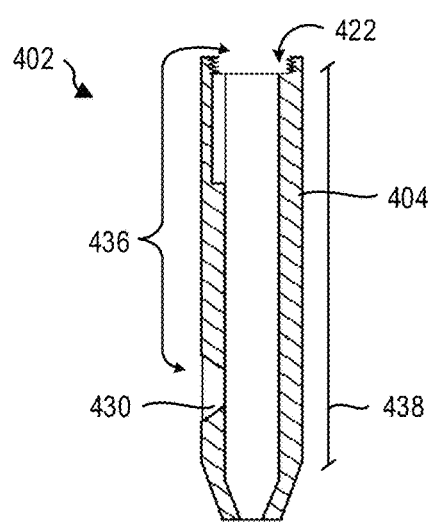
Figures 3, 4:
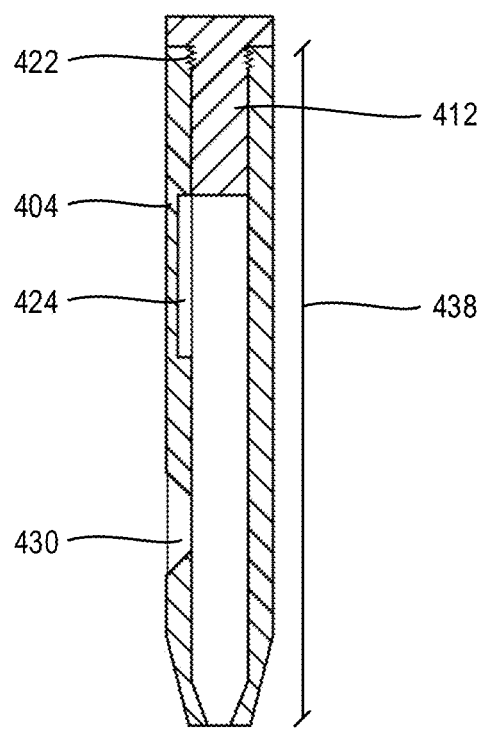

As described above, a model may be or include an assembly that, in turn, includes a plurality of components that, in turn, include a plurality of subcomponents. The components and subcomponents may each be a fit component or a functional component. In some embodiments, a component includes integrally formed subcomponents. For example, FIG. 4-1 illustrates an embodiment of a model 432 of an adaptive grip 402 (similar to the model 332 of FIG. 3) that includes a first subcomponent including the threaded portion 422 (e.g., to connect to a removable cap) and a second subcomponent including a window 430 to allow access to an input button of a digital stylus. The model 432 of the adaptive grip 402 further includes a third subcomponent that includes a body 404 that connects the first subcomponent to the second subcomponent.

In the illustrated embodiment, the body 404 is integrally formed from a single piece of material, and many conventional CAD models may consider the body 404 to have a single set of dimensions in the component properties. However, in some embodiments, the first subcomponent and second subcomponents are functional components 436, while the third subcomponent of the body 404 is a fit component 434.

FIG. 4-2 illustrates at least one problem caused by treating the body 404 component as a unitary component without subcomponents. When scaling a height 438 of the body 404, the aspect ratio of all portions of the body 404 are foreshortened equally, producing a foreshortening of the first subcomponent and second subcomponent. For example, a pitch of the threaded portion 422 changes, rendering the threaded portion 422 of the first subcomponent incompatible with the threaded interface of a removable cap. In another example, an aspect ratio of the window 430 is changed, which may prevent interaction with the input buttons of the digital stylus, To ensure the functional components of the model and adaptive grip maintain interoperability, the third subcomponent of the body 404 should be foreshortened without altering the functional components, such as illustrated in the embodiment of FIG. 4-3.

FIG. 4-3 is a side-cross sectional view of the model 432 with a lengthened height 438 of the body 404. The third subcomponent of the body 404 is a fit component and allows the user to edit the dimensions of the third subcomponent. In some embodiments, the dimensions and/or locations (and, optionally, other properties) of functional components (e.g., the threaded portion 422, the keying feature 424, the window 430) remain fixed during the alteration of the height 438 of the body 404 component. In some embodiments, changing a dimension or property of a fit component may automatically alter logically linked properties or dimensions of other components or subcomponents to maintain interoperability and/or functionality. For example, at least one dimension of the removable cap 412 is changed in response to a change in the height 438 of the body 404.

Therefore, the dimensions of the threaded portion 422 and the window 430 included in the first subcomponent and second subcomponent remain unchanged, and the threaded portion 422 and the window 430 maintain interoperability with other components of the assembly in the model and with the digital stylus.

Figure 5:
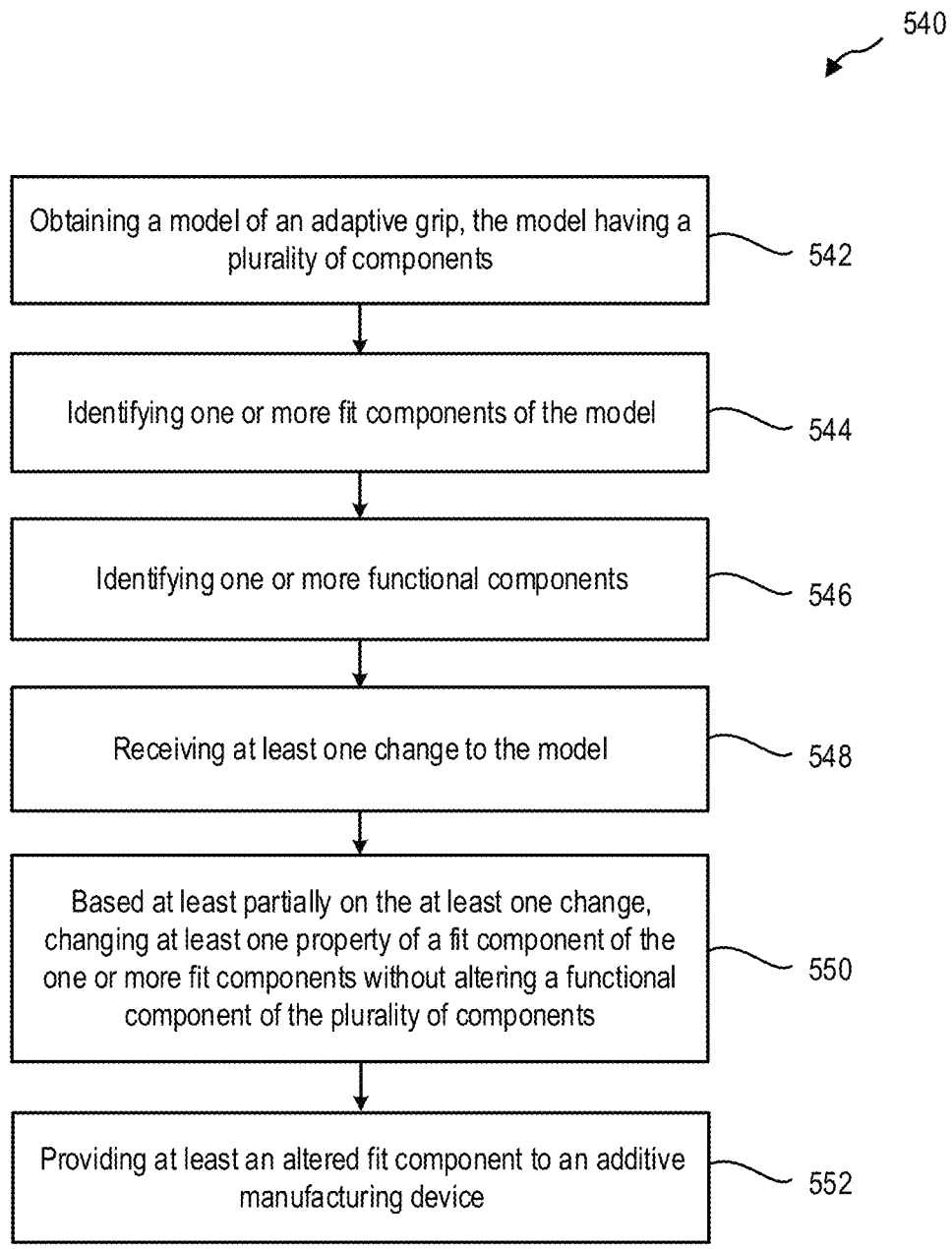
FIG. 5 is a flowchart illustrating a method of manufacturing an adaptive grip, according to at least some embodiments of the present disclosure.

FIG. 5 is a flowchart illustrating an embodiment of a method 540 of manufacturing a custom adaptive grip for providing inputs to an electronic device via a digital stylus. In some embodiments, the method 540 includes, at a computing device, obtaining a model of an adaptive grip, where the model is an assembly containing a plurality of components, at 542. In some embodiments, at least one component of the model has a plurality of subcomponents. In some embodiments, obtaining the model includes receiving the model at a processor or system memory from a local hardware storage device. In some embodiments, obtaining the model includes receiving the model at a processor or system memory from a remote hardware storage device, such as from cloud storage or another server computer accessed via a network.

The method 540 further includes identifying one or more fit components of the model at 544. In some embodiments, identifying one or more fit components of the model includes reading at least one property of the components and/or subcomponents of the model. For example, some models obtained according to an embodiment of the method 540 described herein may include a fit component property or tag in the properties of the CAD model.

In some embodiments, the method 540 further includes identifying one or more functional components of the model at 546. In some embodiments, identifying one or more functional components of the model includes reading at least one property of the components and/or subcomponents of the model. For example, some models obtained according to an embodiment of the method 540 described herein may include a functional component property or tag in the properties of the CAD model.

The method 540 further includes, in some embodiments, receiving at least one change to the model at 548. In some embodiments, the change is received from a webpage or web portal that provides the change at least one property of the model. In some embodiments, the change is received at the computing device from a human interface device connected to the computing device. Based at least partially on the at least one change, the method 540 further includes changing at least one property of a fit component of the one or more fit components without altering a functional component of the plurality of components at 550. As described herein, the properties and/or values of the functional components may be locked from alteration to maintain interoperability of the functional components. The properties of the fit component(s) are editable to allow the user to customize a fit of the adaptive grip to the user's body for comfort and performance.

In some embodiments, the method 540 includes providing at least an altered fit component to an additive manufacturing device at 552. The additive manufacturing device may then print a physical part according to the properties and/or values of the altered fit component to produce part of the adaptive grip.

Figure 6:
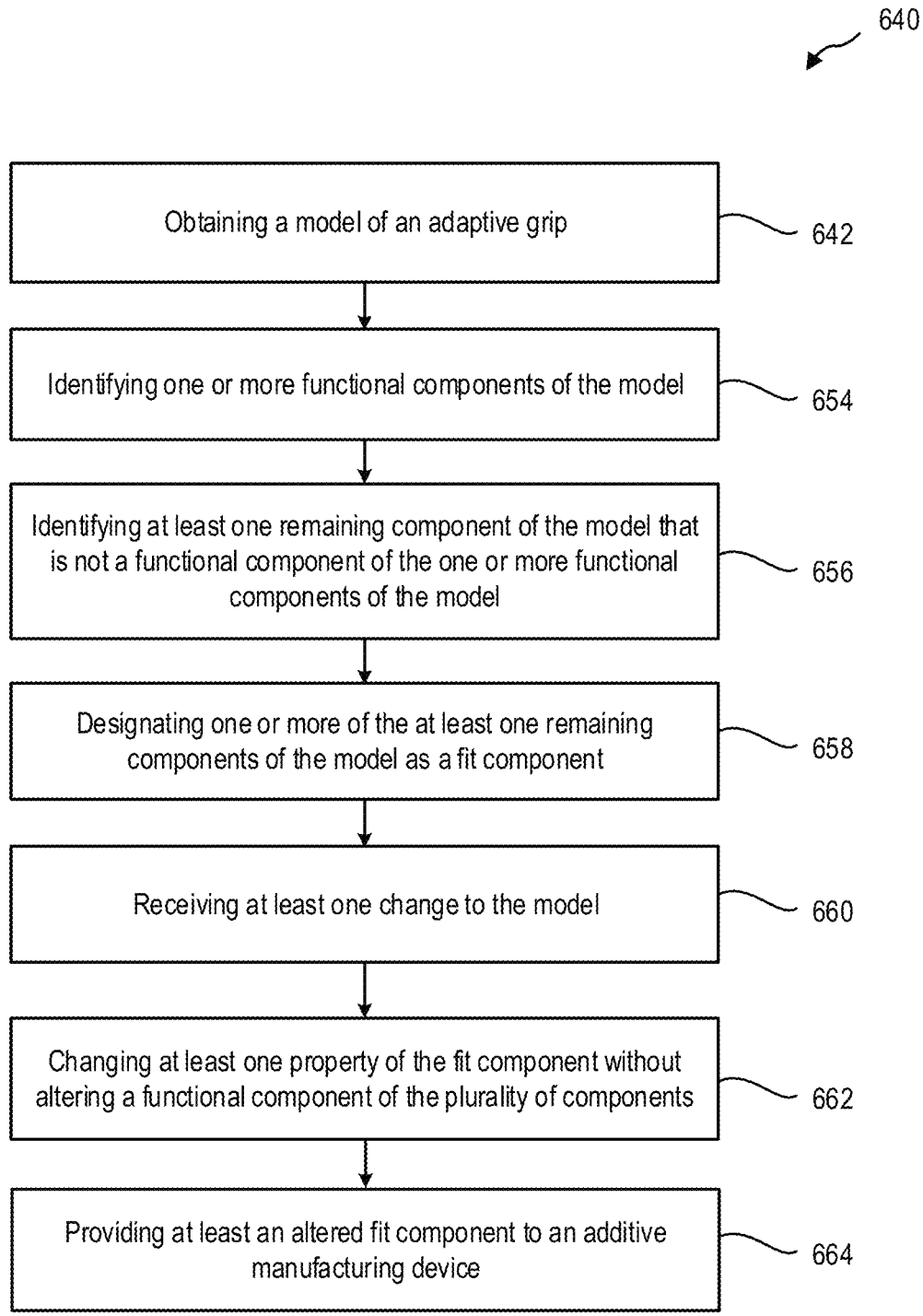
FIG. 6 is a flowchart illustrating another method of manufacturing an adaptive grip, according to at least some embodiments of the present disclosure.

In some embodiments, the CAD model does not include properties and/or values to distinguish between fit components and functional components. In at least one embodiment, the CAD model is a unitary model that includes only one component. FIG. 6 is a flowchart illustrating another embodiment of a method 640 of manufacturing an adaptive peripheral from a model lacking information about fit components and/or functional components.

The method 640 includes obtaining a model of a peripheral at 642 at a computing device, similar to as described in relation to FIG. 5, but the model does not include properties and/or values to distinguish between fit components and functional components. The method 640 then includes identifying the functional components and fit components to distinguish therebetween before alterations are made to a component or subcomponent of the model.

In some embodiments, the method 640 includes identifying one or more functional components of the model at 654. In some embodiments, identifying one or more functional components includes parsing a component name, title, properties, or values to identify a term associated with functional components, such as "switch", "thread", "button", or "connector" that allows the computing device to identify a component as a functional component. In some embodiments, the computing device uses object recognition to identify functional components, such as identifying a helical structure as a threaded interface. The computing device may designate the identified component as a functional component and subsequently identify at least one remaining component of the model that is not a functional component of the one or more functional components of the model at 656. The identified remaining component is then designated as a fit component at 658.

In some embodiments, the method 640 splits a unitary model (i.e., a model received without any components of the model) based at least partially on object recognition to identify functional components, such as identifying a helical structure as a threaded interface. The computing system may then designate a portion of the model adjacent to the functional component as part of the functional component to ensure that alterations to a remaining portion of the model do not compromise the interoperability of the identified functional component.

The method 640 further includes receiving at least one change to the model at 660 (such as described in relation to FIG. 5) and changing at least one property of the fit component without altering a functional component of the one or more functional components of the model at 662 before providing at least an altered fit component to an additive manufacturing device at 664.

Figure 7:
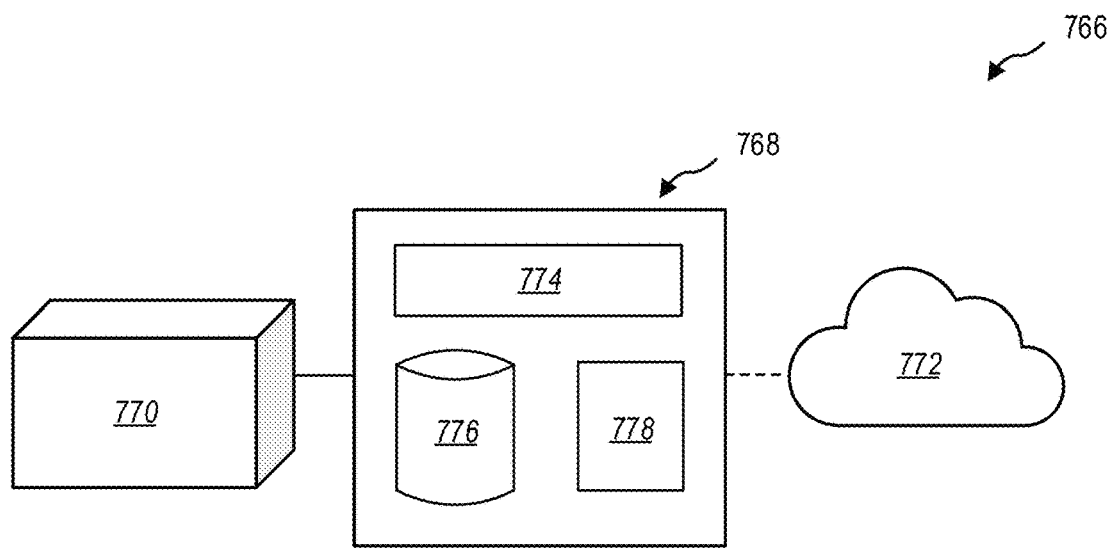
FIG. 7 is a schematic illustration of a system for manufacturing an adaptive grip, according to at least some embodiments of the present disclosure.

FIG. 7 is schematic representation of an embodiment of a system 766 for manufacturing an adaptive peripheral. The system 766 includes, in some embodiments, a computing device 768 in data communication with an additive manufacturing device 770. In some embodiments, the computing device 768 is further in data communication with a network 772 through which the computing device may obtain models of adaptive grips. In some embodiments, the computing device 768 is local to the additive manufacturing device 770. In some embodiments, the computing device 768 is in data communication with the additive manufacturing device 770 via the network 772.

The computing device 768 includes a processor 774 in data communication with a hardware storage device 776 and in data communication with a communication device 778. In some embodiments, the hardware storage device 776 is any non-transient computer readable medium that may store instructions thereon. The hardware storage device 776 may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device 776 is local to and/or integrated with the computing device. The hardware storage device 776 has instructions stored thereon that, when executed by the processor 774, cause the computing device 768 to perform at least part of any of the methods described herein. In some embodiments, the computing device 768 may communicate with the additive manufacturing device 770 to perform at least a part of a method. For example, providing at least the altered fit component to the additive manufacturing device 770 may cause the additive manufacturing device 770 to change filaments for a printing of the part corresponding to the altered fit component.

In some embodiments, the communication device 778 is a wired communication device, such as an ethernet network card that allows wired data communication with a network or a peripheral connection port (e.g., universal serial bus port) that allows connection to an external peripheral. In some embodiments, the communication device 778 is a wireless communication device that allows data communication with a network access point or data communication with a local peripheral, such as a Bluetooth or 802.11 peripheral.

Figure 8:
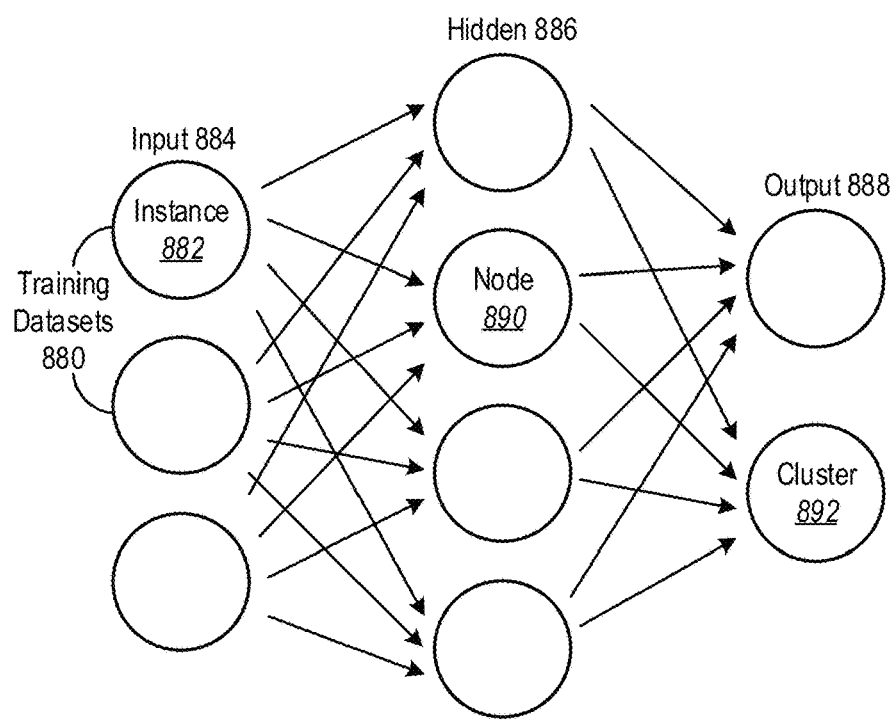
FIG. 8 is a schematic representation of a machine learning system used in a method of manufacturing an adaptive grip, according to at least some embodiments of the present disclosure.

In some embodiments, identifying a functional component in a CAD model (such as described in relation to FIG. 6) is at least partially determined by a machine learning (ML) system. FIG. 8 is a schematic representation of an ML model that may be used with one or more embodiments of systems and methods described herein. As used herein, a "machine learning model" refers to a computer algorithm or model (e.g., a classification model, a regression model, a language model, an object detection model) that can be tuned (e.g., trained) based on training input to approximate unknown functions. For example, an ML model may refer to a neural network or other machine learning algorithm or architecture that learns and approximates complex functions and generate outputs based on a plurality of inputs provided to the machine learning model. In some embodiments, an ML system, model, or neural network described herein is an artificial neural network. In some embodiments, an ML system, model, or neural network described herein is a convolutional neural network. In some embodiments, an ML system, model, or neural network described herein is a recurrent neural network. In at least one embodiment, an ML system, model, or neural network described herein is a Bayes classifier. As used herein, a "machine learning system" may refer to one or multiple ML models that cooperatively generate one or more outputs based on corresponding inputs. For example, an ML system may refer to any system architecture having multiple discrete ML components that consider different kinds of information or inputs.

As used herein, an "instance" refers to an input object that may be provided as an input to an ML system to use in generating an output, such as a model, components, sub-components, and properties or values thereof. For example, an instance may refer to any existing model of an adaptive peripheral. For example, an existing model of an adaptive peripheral may include designated functional components, and the ML model may learn the appearance, shape, or other properties or tags associated with the functional components.

In some embodiments, the machine learning system has a plurality of layers with an input layer 884 configured to receive at least one input training dataset 880 or input training instance 882 and an output layer 888, with a plurality of additional or hidden layers 886 therebetween.

In some embodiments, the machine learning system can receive multiple training datasets concurrently and learn from the different training datasets simultaneously.

In some embodiments, the machine learning system includes a plurality of machine learning models that operate together. Each of the machine learning models has a plurality of hidden layers between the input layer and the output layer. The hidden layers have a plurality of input nodes (e.g., nodes 890), where each of the nodes operates on the received inputs from the previous layer. In a specific example, a first hidden layer has a plurality of nodes and each of the nodes performs an operation on each instance from the input layer. Each node of the first hidden layer provides a new input into each node of the second hidden layer, which, in turn, performs a new operation on each of those inputs. The nodes of the second hidden layer then passes outputs, such as identified clusters 892, to the output layer.

In some embodiments, each of the nodes 890 has a linear function and an activation function. The linear function may attempt to optimize or approximate a solution with a line of best fit. The activation function operates as a test to check the validity of the linear function. In some embodiments, the activation function produces a binary output that determines whether the output of the linear function is passed to the next layer of the machine learning model. In this way, the machine learning system can limit and/or prevent the propagation of poor fits to the data and/or non-convergent solutions.

The machine learning model includes an input layer that receives at least one training dataset. In some embodiments, at least one machine learning model uses supervised training. In some embodiments, at least one machine learning model uses unsupervised training. Unsupervised training can be used to draw inferences and find patterns or associations from the training dataset(s) without known outputs (such as designated functional and/or fit components. In some embodiments, unsupervised learning can identify clusters of similar labels or characteristics for a variety of training instances and allow the machine learning system to extrapolate the designations of instances with similar characteristics.

In some embodiments, semi-supervised learning can combine benefits from supervised learning and unsupervised learning. As described herein, the machine learning system can identify associated labels or characteristic between instances, which may allow a training dataset with known outputs and a second training dataset including more general input information to be fused. Unsupervised training can allow the machine learning system to cluster the instances from the second training dataset without known outputs and associate the clusters with known outputs from the first training dataset. In at least one embodiment, a system or method according to the present disclosure can improve performance, improve comfort, and/or reduce costs for users requiring adaptive grips or other peripherals.

Figure 9:
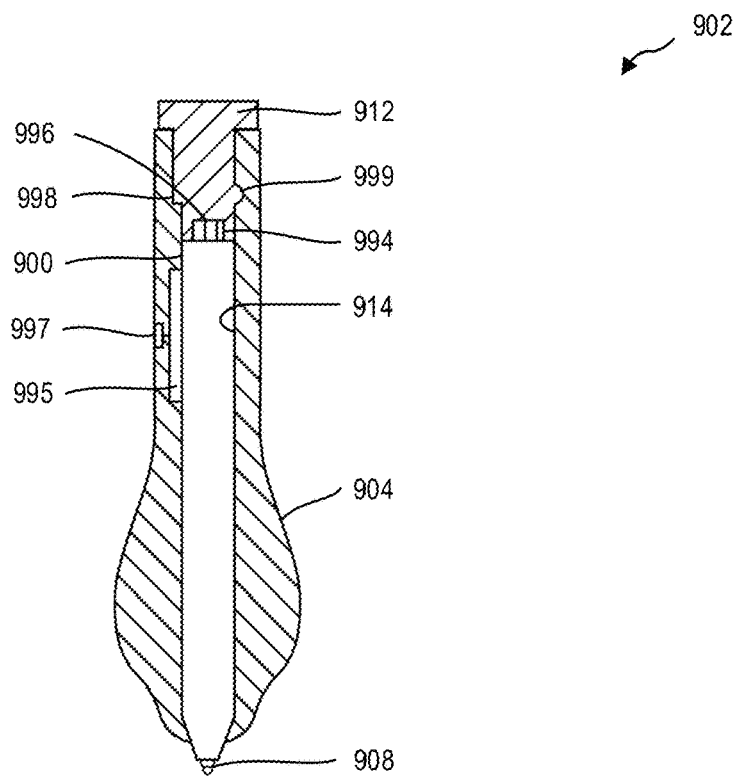
FIG. 9 is a cross-sectional side view of a digital stylus and another adaptive grip, according to at least some embodiments of the present disclosure.

FIG. 9 is a perspective view of another embodiment of an adaptive grip 902 according to the present disclosure. In some embodiments, the digital stylus 900 lacks a tail clip or other elements or components that protrude perpendicularly from a longitudinal axis of the digital stylus 900 that may interact with a keying feature in the inner surface 914 of the adaptive grip 902. In some embodiments, a proximal end of the digital stylus 900 (e.g., opposite the distal inking tip 908) may have a charging connector, a data connector, an electrical connector, or another rotationally fixed feature 994.

In some embodiments, the removable cap 912 includes a first keying feature 996 that engages with the rotationally fixed feature 994 of the proximal end of the digital stylus 900. The first keying feature 996 ensures that the removable cap 912 is rotationally keyed (or fixed) relative to the digital stylus 900. To rotationally fix the body 904 of the adaptive grip 902 to the digital stylus 900, the removable cap 912 is keyed to the body 904. For example, the removable cap 912 may have a threaded connection (such as that described herein) with which the removable cap 912 connects to the body 904 at a known rotational relationship. However, the precise rotational position of the removable cap 912 relative to the body 904 may vary depending on manufacturing tolerances, material plasticity or elasticity, or the torque applied by the user upon connection.

In some embodiments, a second keying feature 998 of the removable cap 912 may rotationally fix or key the removable cap 912 to the body 904 of the adaptive grip 902. For example, a second keying feature 998 including a spline (such as that shown in FIG. 9) may rotationally key the removable cap 912 to the body 904 and allow longitudinal movement of the removable cap 912 relative to the body 904 for a snap fit (such as via a longitudinal detent 999). In some embodiment, a threaded or otherwise rotational connection may include a rotational detent such that a complementary protrusion and detent between the removable cap 912 and the body 904 engage and limit or prevent rotation of removable cap 912 away from the selected position of the detent. By keying the digital stylus 900 to the removable cap 912 and keying the removable cap 912 to the body 904, the adaptive grip 902 can key the digital stylus 900 to the body 904, including any window or movable transmission feature.

In some embodiments, a digital stylus 900 included an inductive charging receiving coil that allows the digital stylus 900 to be charged through the application of a magnetic field. When the digital stylus 900 is positioned in some embodiments of an adaptive grip 902 according to the present disclosure, the inductive charging receiving coil of the digital stylus 900 may be positioned too far from an exterior surface of the body 904 of the adaptive grip 902 to allow inductive charging of the digital stylus 900. In some embodiments, an adaptive grip 902 includes an inductive charging transmission coil 995 (or a recess into which an inductive charging transmission coil 995 may be positioned). By keying the digital stylus 900 to the body 904 of the adaptive grip 902, the inductive charging transmission coil 995 may provide a magnetic field to an inductive charging receiving coil of the digital stylus 900 to charge the digital stylus 900 while inside the adaptive grip 902. For example, a port 997 (such as a universal serial bus port or other electrical connection port) may be provided in the adaptive grip 902 to provide power to the inductive charging transmission coil 995.

Figure 10:
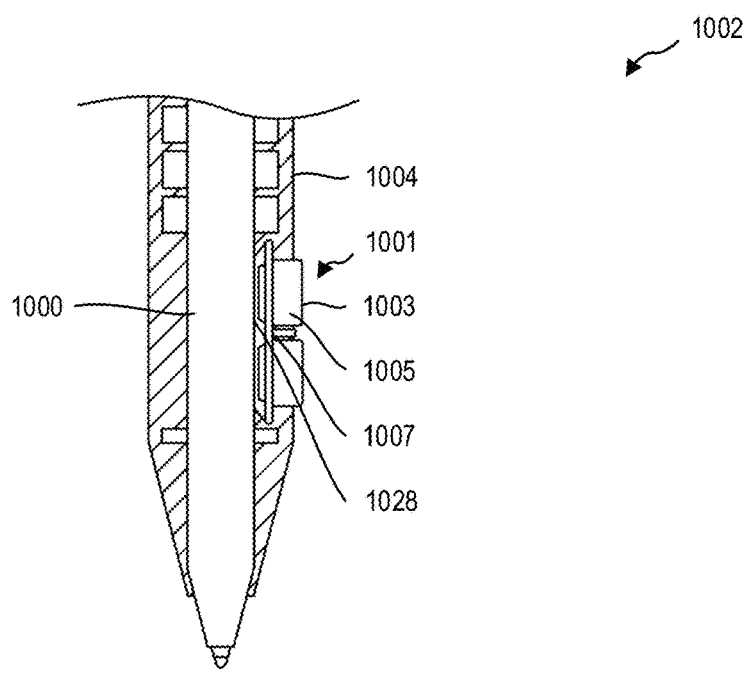
FIG. 10 is a detail cross-sectional view of a digital stylus and an adaptive grip with a movable transmission feature including an elastic member, according to at least some embodiments of the present disclosure.

FIG. 10 illustrates an embodiment of a movable transmission feature 1001. In some embodiments, an adaptive grip 1002 includes a movable transmission feature 1001 configured to transmit force applied by a user to an outer surface of the adaptive grip 1002 to an input button 1028 of the digital stylus 1000 positioned therein. For example, a movable transmission feature 1001 includes a contact surface 1003 that receives a force from the user, and the contact surface 1003 is part of a transmission member 1005 configured to move relative to the body 1004 of the adaptive grip 1002. The transmission member 1005, in turn, transmits the force to the input button 1028.

In some embodiments, the transmission member 1005 is connected to the body 1004 by an elastic member 1007, such as a second material that is more elastic than the material of the body 1004. For example, when a user applies a force to the contact surface 1003, the elastic member 1007 elastically deforms more than the body 1004 to allow the transmission member 1005 to move relative to the body 1004 and depress the input button 1028 of the digital stylus 1000.

Figure 11:
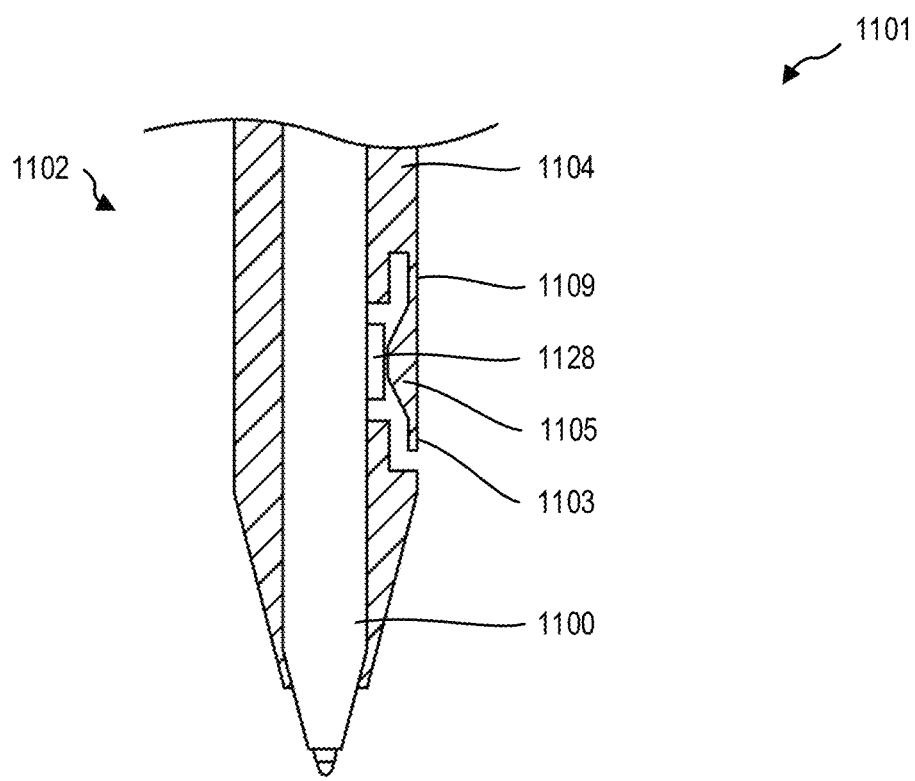
FIG. 11 is a detail cross-sectional view of a digital stylus and an adaptive grip with a movable transmission feature including a lever, according to at least some embodiments of the present disclosure.

The embodiment of a movable transmission feature 1001 described in relation to FIG. 10 provides a substantially direct transmission of a force applied to the contact surface 1003 to the input button 1028 of the digital stylus 1000. In some embodiments, such as illustrated in FIG. 11, a movable transmission feature 1101 increases the force applied to the input button 1128, thereby reducing the force required from the user to actuate the input button 1128.

In some embodiments, the movable transmission feature 1101 includes a lever 1109 connected to and/or integrally formed with the body 1104 of the adaptive grip 1102. The lever 1109 may elastically deform upon a user applying a force to a contact surface 1103 of the movable transmission feature 1101. In some embodiments, the lever 1109 allows the contact surface 1103 to be in a different longitudinal position than an input button 1128 of the digital stylus 1100. When the force is applied to the contact surface 1103 by the user, the portion of the transmission member 1105 in contact with the input button 1128 moves less (in a transverse direction perpendicular to the longitudinal direction) than the end of the lever 1109 with the contact surface 1103 thereon.

In at least one example, a user may depress the contact surface 1103 of the lever 1109 approximately 3 millimeters while, the transmission member 1105 supported by the lever 1109 depresses the input button 1128 only 1 millimeter. The force required to depress the input button 1128 may be, therefore, reduced for users with limited manual strength or dexterity. In other examples, the contact surface 1103 may be positioned elsewhere on a lever 1109 (e.g., closer to a pivot of the lever 1109) to reduce the distance a user depresses the contact surface 1103 to depress the input button 1128.

In at least some embodiments, a movable transmission feature 1101 including a lever 1109 may allow the adaptive grip 1102 and/or the movable transmission feature 1101 to be manufactured from a single material and/or in a single additive manufacturing session. A single material and/or a single additive manufacturing session may reduce the manufacturing costs associated with the adaptive grip.

INDUSTRIAL APPLICABILITY

The present disclosure generally relates to systems and methods for manufacturing at least part of a peripheral for an electronic device. More particularly, systems and methods described herein allow for manufacturing of a customized adaptive peripheral for use with electronic devices.

In some embodiments, systems and methods according to the present disclosure allow a user to customize one or more parts of a peripheral prior to manufacturing, such that the manufactured part(s) meet the user's needs while remaining interoperable with other components of the peripheral. Systems and methods according to the present disclosure may reduce costs and manufacturing time while improving comfort and performance of the manufactured adaptive peripherals.

Depending on a user's physical abilities, an adaptive peripheral for the user may require customized dimensions, weight, resistance, shape, material, texture, or color. Conventionally, a custom adaptive peripheral is commissioned and crafted by hand to the user's specifications. Newer manufacturing methods may use additive manufacturing or three-dimensional (3D) printing to rapidly produce a custom part to the user's specifications. However, modeling and designing the custom part for additive manufacturing conventionally requires computer assisted design (CAD) modeling software and experience using the CAD modeling software, which creates another barrier for users needing adaptive peripherals.

In some examples, adaptive grips for existing peripherals and/or accessories for electronic devices can interfere with or prevent the use of one or more functions of the peripherals and/or accessories. Embodiments of adaptive grips according to the present disclosure include one or more keying features to that interact with the peripheral or accessory to ensure the user can access or interact with functions of the peripheral or accessory. In at least one example, a keying feature on the adaptive grip allows the adaptive grip to align with a body of the peripheral or accessory to support or allow interaction with an input button of the peripheral or accessory when the adaptive grip is positioned on the peripheral or accessory.

In some embodiments, the adaptive grip includes a window through which an input button of the peripheral or accessory is accessible when the adaptive grip is positioned on the peripheral or accessory and the keying feature is engaged with a complementary keying feature on the peripheral or accessory. For example, a keying feature of the adaptive grip and a complementary keying feature on the peripheral or accessory may rotationally key the adaptive grip relative to the peripheral or accessory to align the window with the input button of the peripheral or accessory. The user may then engage with the input button through the window of the adaptive grip to access the associated function(s) of the input button.

In some embodiments, the adaptive grip includes a movable transmission feature configured to transmit an input through the adaptive grip to an input button of the peripheral or accessory when the adaptive grip is positioned on the peripheral or accessory and the keying feature is engaged with a complementary keying feature on the peripheral or accessory. For example, a keying feature of the adaptive grip and a complementary keying feature on the peripheral or accessory may rotationally key the adaptive grip relative to the peripheral or accessory to align the movable transmission feature with the input button of the peripheral or accessory. The user may then engage with the movable transmission feature of the adaptive grip to move at least a portion of the movable transmission feature and actuate the input button(s) of the adaptive grip. For example, an elastically deformable portion of the adaptive grip may allow the user to apply a force to the movable transmission feature to bend or depress the movable transmission feature, which transmits the force to the input button of the peripheral or accessory. When the user removes the force from the movable transmission feature, the movable transmission feature may elastically return to the original state, removing the force from the input button.

In some embodiments, the adaptive grip is customizable to user's needs. In some embodiments, the adaptive grip is manufactured by additive manufacturing (e.g., three-dimensional printing). Additive manufacturing can allow a user or technician to provide a CAD model to an additive manufacturing system and create the adaptive grip from a variety of materials. In some embodiments, a CAD model according to the present disclosure can include customizable portions of the CAD model and locked or non-customizable features to ensure compatibility and/or interoperability with the peripheral or accessory device.

In some embodiments, a base model of a peripheral is obtained, and a user provides changes to the base model that can be applied to one or more components of the model to allow the alterations to accommodate the user's needs while the parts remain interoperable and compatible with one another to simplify manufacturing and assembly. For example, an existing CAD model may include a plurality of components to the CAD model that are independently editable. In some embodiments, a system or method according to the present disclosure identifies at least one component of the plurality of components as a fit component, which is editable to the user for customization purposes, and identify at least one component as a functional component, which is non-editable or locked to the user for customization purposes. In at least one example, the user has the option to alter or customize the CAD model through a webpage or web portal by changing properties and/or values of the fit components, while the properties and/or values of the functional components remain locked.

In some embodiments, the keying feature of the adaptive grip, at least one dimension of the adaptive grip, a window, or a movable transmission feature are locked or non-editable functional components of the adaptive grip. In some embodiments, the adaptive grip includes a body with an internal volume configured to receive a digital stylus. The adaptive grip has a distal opening to allow an inking tip of the digital stylus to protrude from the internal volume and allow the digital stylus to interact with a touch-sensitive device, such as a trackpad or touchscreen of another electronic device.

In some embodiments, the body has an external shape, size, surface texture, surface material, etc. that assists a user with limited manual dexterity or strength to hold or manipulate the digital stylus. For example, the body may have a greater thickness than the digital stylus. In other example, the body may have a surface texture or protrusions that allow for a user to grip the adaptive grip. In various embodiments, the external dimensions of the adaptive grip are customizable to the particular needs or preferences of the user, and the adaptive grip may have any number of external shapes depending on the particular needs or preferences of the user.

As described herein, the adaptive grip has an internal volume. In some embodiments, the internal volume receives the digital stylus in a longitudinal direction. For example, a removable cap may be located opposite the distal opening. In some embodiments, the removable cap may be connectable to the body to retain the digital stylus in the internal volume of the adaptive grip. In some embodiments, the removable cap may be located at a distal end of the body and include the distal opening. For example, the digital stylus may be inserted into the internal volume from the distal end of the body and the removable cap may be connected to the body to retain the digital stylus in the internal volume.

In other embodiments, the adaptive grip includes additional or other retention features in the body and/or the removable cap. For example, an inner surface of the body (proximate the internal volume) may provide a friction fit with the surface of the digital stylus to retain or help retain the digital stylus in the internal volume. In some embodiments, a friction fit between the body and the digital stylus allows the adaptive grip to retain the digital stylus in the internal volume against the force of gravity, while a closed proximate end of the body provides support against the compressive force (in the longitudinal direction) applied to the inking tip during use.

In some embodiments, the adaptive grip includes a body with a first portion and a second portion that connect to one another around the digital stylus. In some embodiments, the adaptive grip is formed by joining the first portion and the second portion without additional fasteners, such as via a snap fit, compression fit, friction fit, or combinations thereof. In some embodiments, the adaptive grip is formed by joining the first portion and the second portion with at least one fastener, such as a screw, clip, clamp, pin, or other fastener that applies a force to hold the first portion and second portion in contact with one another and/or in position on the digital stylus.

In some embodiments, the first portion and second portion may be further held in contact with one another and/or in position on the digital stylus by a removable cap. For example, the first portion and second portion may, when positioned in contact with one another, form a threaded portion or other connection mechanism to which the removable cap may connect through a complementary connection mechanism. The removable cap may, thereby, provide a compression force or otherwise limit the movement of the first portion and second portion relative to one another.

In some embodiments, the retention feature(s) of the adaptive grip limits and/or prevents longitudinal movement of the digital stylus relative to the adaptive grip. In some embodiments, the adaptive grip further includes at least one keying feature that interacts with a portion of the digital stylus to limit and/or prevent rotational movement of the digital stylus relative to the adaptive grip. In some embodiments, the digital stylus includes a tail clip or other non-rotationally symmetric element that engages with the keying feature to key the digital stylus rotationally relative to the adaptive grip.

In some embodiments, the tail clip is rotationally aligned on the digital stylus with one or more input buttons. In some embodiments, the tail clip is not rotationally aligned on the digital stylus with one or more input buttons but is rotationally fixed relative to one or more input buttons such that the input buttons are rotationally located at a known position relative to the tail clip. The position of the tail clip relative to the input buttons may be used to key a position of a window or movable transmission feature to the input buttons. For example, the keying feature (such as a recess that receives the tail clip) may key the body of the adaptive grip to the digital stylus such that the window aligns with the input buttons to allow access to the input buttons.

In another example, the window may be the keying feature. For example, the input buttons ay protrude into and/or through window to limit and/or prevent rotation of the digital stylus relative to the adaptive grip. However, contact between the input buttons and the body of the adaptive grip may be undesirable, as the contact may limit or prevent the user from providing inputs to the input buttons or may cause unintended inputs to the input buttons. In some embodiments, therefore, it is desirable to have a keying feature that engages with a portion of the digital stylus that is not an input button.

As described herein, the external shape or materials may be customizable based at least partially on particular needs or preferences of the user. In some embodiments, a CAD model is a javascript computer assisted design (JSCAD) format, .stl format, .stp format, or other open-source or propriety format. The model includes and/or represents a plurality of components in the adaptive grip. In some embodiments, the plurality of components includes fit components and functional components. The functional components include any component or part of the model that includes a connection interface with another component or a mechanical or electrical interface to receive an input to the peripheral. In some embodiments, the fit components include any remaining portion of the CAD model that is not a functional component.

In some embodiments, the fit components include a body or a removable cap, or other portion of the model that corresponds to a contact surface or other surface of the adaptive grip that a user may touch during use. The fit components may be editable to alter one or more properties or values to improve the comfort or performance of the adaptive grip for the user. For example, increasing a thickness of the body increase the precision with which a user can control the inking tip of the digital stylus, reducing fatigue and improving comfort. In another example, decreasing the thickness of the body may reduce a depth of the window, which may improve comfort for the user providing input to the digital stylus.

In some embodiments, the editable properties or values of the fit component of a model include any of length, width, height, thickness, perimeter shape (such as a plan-view or cross-sectional view shape), color, texture, or material. In some embodiments, the material may be changed or selected based on one or more desired material properties, such as a coefficient of friction (such as to improve grip on the adaptive grip), an elastic modulus (such as for a movable transmission feature, as will be described in more detail herein), or a vibration damping property. For example, a model may include a plurality of available materials and a user selection of a coefficient of friction may cause the material assigned to the fit component to change in the model to approximate or match the desired coefficient of friction. In another example, a model may include a plurality of available materials and a user selection of a compressibility of the adaptive grip may cause the material assigned to the fit component to change in the model to approximate or match a desired elastic modulus.

The model may include a value or characteristic associated with each component of the model that designates the component as either a functional component or a fit component. For example, a model may include discrete components within the model that combine to form the complete model of the adaptive grip. In some embodiments, a model according to the present disclosure allows for subcomponents of a single component, where each subcomponent may be designated a fit component or a functional component.

In some embodiments, the model includes at least a body that includes both fit components and functional components. In some embodiments, at least one fit component or functional component is subcomponent of another component. For example, in the illustrated embodiment, the body includes a portion that includes a threaded portion that is a functional component, a second portion that includes a keying feature, where the keying feature is also a functional component. The functional components have at least dimensions or other properties that become locked or non-editable in the model properties to ensure the functional components continue to be interoperable with other functional components of the model and/or a digital stylus.

In some embodiments, the functional components include a movable transmission feature, a window, a distal opening, a keying feature, a connection interface such as a threaded portion, or other components or subcomponents that allow interaction with a portion of the digital stylus or connect a part of the adaptive grip to another part of the adaptive grip or to the digital stylus. For example, the window of the adaptive grip is designated as a functional component to ensure the window is properly located and sized to allow interactions with an input button while other properties of the body (e.g., length, thickness, material) remain customizable. In some embodiments, editable properties or values of the functional components include color or other properties that will not alter the function, size, or shape of the functional components.

As described above, a model may be or include an assembly that, in turn, includes a plurality of components that, in turn, include a plurality of subcomponents. The components and subcomponents may each be a fit component or a functional component. In some embodiments, a component includes integrally formed subcomponents.

In some embodiments, a method of manufacturing a custom adaptive grip for providing inputs to an electronic device via a digital stylus includes, at a computing device, obtaining a model of an adaptive grip, where the model is an assembly containing a plurality of components. In some embodiments, at least one component of the model has a plurality of subcomponents. In some embodiments, obtaining the model includes receiving the model at a processor or system memory from a local hardware storage device. In some embodiments, obtaining the model includes receiving the model at a processor or system memory from a remote hardware storage device, such as from cloud storage or another server computer accessed via a network.

The method further includes identifying one or more fit components of the model. In some embodiments, identifying one or more fit components of the model includes reading at least one property of the components and/or subcomponents of the model. For example, some models obtained according to an embodiment of the method described herein may include a fit component property or tag in the properties of the CAD model.

In some embodiments, the method further includes identifying one or more functional components of the model. In some embodiments, identifying one or more functional components of the model includes reading at least one property of the components and/or subcomponents of the model. For example, some models obtained according to an embodiment of the method described herein may include a functional component property or tag in the properties of the CAD model.

The method further includes, in some embodiments, receiving at least one change to the model. In some embodiments, the change is received from a webpage or web portal that provides the change at least one property of the model. In some embodiments, the change is received at the computing device from a human interface device connected to the computing device. Based at least partially on the at least one change, the method further includes changing at least one property of a fit component of the one or more fit components without altering a functional component of the plurality of components. As described herein, the properties and/or values of the functional components may be locked from alteration to maintain interoperability of the functional components. The properties of the fit component(s) are editable to allow the user to customize a fit of the adaptive grip to the user's body for comfort and performance.

In some embodiments, the method includes providing at least an altered fit component to an additive manufacturing device. The additive manufacturing device may then print a physical part according to the properties and/or values of the altered fit component to produce part of the adaptive grip.

In some embodiments, the CAD model does not include properties and/or values to distinguish between fit components and functional components. In at least one embodiment, the CAD model is a unitary model that includes only one component. In some embodiments, a method of manufacturing an adaptive peripheral from a model lacking information about fit components and/or functional components includes obtaining a model of a peripheral at a computing device, but the model does not include properties and/or values to distinguish between fit components and functional components. The method then includes identifying the functional components and fit components to distinguish therebetween before alterations are made to a component or subcomponent of the model.

In some embodiments, the method includes identifying one or more functional components of the model. In some embodiments, identifying one or more functional components includes parsing a component name, title, properties, or values to identify a term associated with functional components, such as "switch", "thread", "button", or "connector" that allows the computing device to identify a component as a functional component. In some embodiments, the computing device uses object recognition to identify functional components, such as identifying a helical structure as a threaded interface. The computing device may designate the identified component as a functional component and subsequently identify at least one remaining component of the model that is not a functional component of the one or more functional components of the model. The identified remaining component is then designated as a fit component.

In some embodiments, the method splits a unitary model (i.e., a model received without any components of the model) based at least partially on object recognition to identify functional components, such as identifying a helical structure as a threaded interface. The computing system may then designate a portion of the model adjacent to the functional component as part of the functional component to ensure that alterations to a remaining portion of the model do not compromise the interoperability of the identified functional component.

The method further includes receiving at least one change to the model at and changing at least one property of the fit component without altering a functional component of the one or more functional components of the model before providing at least an altered fit component to an additive manufacturing device.

In some embodiments, a system for manufacturing an adaptive peripheral includes a computing device in data communication with an additive manufacturing device. In some embodiments, the computing device is further in data communication with a network through which the computing device may obtain models of adaptive grips. In some embodiments, the computing device is local to the additive manufacturing device. In some embodiments, the computing device is in data communication with the additive manufacturing device via the network.

The computing device includes a processor in data communication with a hardware storage device and in data communication with a communication device. In some embodiments, the hardware storage device is any non-transient computer readable medium that may store instructions thereon. The hardware storage device may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device is local to and/or integrated with the computing device. The hardware storage device has instructions stored thereon that, when executed by the processor, cause the computing device to perform at least part of any of the methods described herein. In some embodiments, the computing device may communicate with the additive manufacturing device to perform at least a part of a method. For example, providing at least the altered fit component to the additive manufacturing device may cause the additive manufacturing device to change filaments for a printing of the part corresponding to the altered fit component.

In some embodiments, the communication device is a wired communication device, such as an ethernet network card that allows wired data communication with a network or a peripheral connection port (e.g., universal serial bus port) that allows connection to an external peripheral. In some embodiments, the communication device is a wireless communication device that allows data communication with a network access point or data communication with a local peripheral, such as a Bluetooth or 802.11 peripheral.

In some embodiments, identifying a functional component in a CAD model is at least partially determined by a machine learning (ML) system. As used herein, a "machine learning model" refers to a computer algorithm or model (e.g., a classification model, a regression model, a language model, an object detection model) that can be tuned (e.g., trained) based on training input to approximate unknown functions. For example, an ML model may refer to a neural network or other machine learning algorithm or architecture that learns and approximates complex functions and generate outputs based on a plurality of inputs provided to the machine learning model. In some embodiments, an ML system, model, or neural network described herein is an artificial neural network. In some embodiments, an ML system, model, or neural network described herein is a convolutional neural network. In some embodiments, an ML system, model, or neural network described herein is a recurrent neural network. In at least one embodiment, an ML system, model, or neural network described herein is a Bayes classifier. As used herein, a "machine learning system" may refer to one or multiple ML models that cooperatively generate one or more outputs based on corresponding inputs. For example, an ML system may refer to any system architecture having multiple discrete ML components that consider different kinds of information or inputs.

As used herein, an "instance" refers to an input object that may be provided as an input to an ML system to use in generating an output, such as a model, components, sub-components, and properties or values thereof. For example, an instance may refer to any existing model of an adaptive peripheral. For example, an existing model of an adaptive peripheral may include designated functional components, and the ML model may learn the appearance, shape, or other properties or tags associated with the functional components.

In some embodiments, the machine learning system has a plurality of layers with an input layer configured to receive at least one input training dataset or input training instance and an output layer, with a plurality of additional or hidden layers therebetween.

In some embodiments, the machine learning system can receive multiple training datasets concurrently and learn from the different training datasets simultaneously.

In some embodiments, the machine learning system includes a plurality of machine learning models that operate together. Each of the machine learning models has a plurality of hidden layers between the input layer and the output layer. The hidden layers have a plurality of input nodes (e.g., nodes), where each of the nodes operates on the received inputs from the previous layer. In a specific example, a first hidden layer has a plurality of nodes and each of the nodes performs an operation on each instance from the input layer. Each node of the first hidden layer provides a new input into each node of the second hidden layer, which, in turn, performs a new operation on each of those inputs. The nodes of the second hidden layer then passes outputs, such as identified clusters, to the output layer.

In some embodiments, each of the nodes has a linear function and an activation function. The linear function may attempt to optimize or approximate a solution with a line of best fit. The activation function operates as a test to check the validity of the linear function. In some embodiments, the activation function produces a binary output that determines whether the output of the linear function is passed to the next layer of the machine learning model. In this way, the machine learning system can limit and/or prevent the propagation of poor fits to the data and/or non-convergent solutions.

The machine learning model includes an input layer that receives at least one training dataset. In some embodiments, at least one machine learning model uses supervised training. In some embodiments, at least one machine learning model uses unsupervised training. Unsupervised training can be used to draw inferences and find patterns or associations from the training dataset(s) without known outputs (such as designated functional and/or fit components. In some embodiments, unsupervised learning can identify clusters of similar labels or characteristics for a variety of training instances and allow the machine learning system to extrapolate the designations of instances with similar characteristics.

In some embodiments, semi-supervised learning can combine benefits from supervised learning and unsupervised learning. As described herein, the machine learning system can identify associated labels or characteristic between instances, which may allow a training dataset with known outputs and a second training dataset including more general input information to be fused. Unsupervised training can allow the machine learning system to cluster the instances from the second training dataset without known outputs and associate the clusters with known outputs from the first training dataset. In at least one embodiment, a system or method according to the present disclosure can improve performance, improve comfort, and/or reduce costs for users requiring adaptive grips or other peripherals.

In some embodiments, the digital stylus lacks a tail clip or other elements or components that protrude perpendicularly from a longitudinal axis of the digital stylus that may interact with a keying feature in the inner surface of the adaptive grip. In some embodiments, a proximal end of the digital stylus (e.g., opposite the distal inking tip) may have a charging connector, a data connector, an electrical connector, or another rotationally fixed feature.

In some embodiments, the removable cap includes a first keying feature that engages with the rotationally fixed feature of the proximal end of the digital stylus. The first keying feature ensures that the removable cap is rotationally keyed (or fixed) relative to the digital stylus. To rotationally fix the body of the adaptive grip to the digital stylus, the removable cap is keyed to the body. For example, the removable cap may have a threaded connection (such as that described herein) with which the removable cap connects to the body at a known rotational relationship. However, the precise rotational position of the removable cap relative to the body may vary depending on manufacturing tolerances, material plasticity or elasticity, or the torque applied by the user upon connection.

In some embodiments, a second keying feature of the removable cap may rotationally fix or key the removable cap to the body of the adaptive grip. For example, a second keying feature including a spline or other keying feature may rotationally key the removable cap to the body and allow longitudinal movement of the removable cap relative to the body for a snap fit (e.g., via a longitudinal detent). In some embodiment, a threaded or otherwise rotational connection may include a rotational detent such that a complementary protrusion and detent between the removable cap and the body engage and limit or prevent rotation of removable cap away from the selected position of the detent. By keying the digital stylus to the removable cap and keying the removable cap to the body, the adaptive grip can key the digital stylus to the body, including any window or movable transmission feature.

In some embodiments, a digital stylus included an inductive charging receiving coil that allows the digital stylus to be charged through the application of a magnetic field. When the digital stylus is positioned in some embodiments of an adaptive grip according to the present disclosure, the inductive charging receiving coil of the digital stylus may be positioned too far from an exterior surface of the body of the adaptive grip to allow inductive charging of the digital stylus. In some embodiments, an adaptive grip includes an inductive charging transmission coil (or a recess into which an inductive charging transmission coil may be positioned). By keying the digital stylus to the body of the adaptive grip, the inductive charging transmission coil may provide a magnetic field to an inductive charging receiving coil of the digital stylus to charge the digital stylus while inside the adaptive grip. For example, a port (such as a universal serial bus port or other electrical connection port) may be provided in the adaptive grip to provide power to the inductive charging transmission coil.

In some embodiments, an adaptive grip includes a movable transmission feature configured to transmit force applied by a user to an outer surface of the adaptive grip to an input button of the digital stylus positioned therein. For example, a movable transmission feature includes a contact surface that receives a force from the user, and the contact surface is part of a transmission member configured to move relative to the body of the adaptive grip. The transmission member, in turn, transmits the force to the input button.

In some embodiments, the transmission member is connected to the body by an elastic member, such as a second material that is more elastic than the material of the body. For example, when a user applies a force to the contact surface, the elastic member elastically deforms more than the body to allow the transmission member to move relative to the body and depress the input button of the digital stylus.

In some embodiments, a movable transmission feature increases the force applied to the input button, thereby reducing the force required from the user to actuate the input button.

In some embodiments, the movable transmission feature includes a lever connected to and/or integrally formed with the body of the adaptive grip. The lever may elastically deform upon a user applying a force to a contact surface of the movable transmission feature. In some embodiments, the lever allows the contact surface to be in a different longitudinal position than an input button of the digital stylus. When the force is applied to the contact surface by the user, the portion of the transmission member in contact with the input button moves less (in a transverse direction perpendicular to the longitudinal direction) than the end of the lever with the contact surface thereon.

In at least one example, a user may depress the contact surface of the lever approximately 3 millimeters while, the transmission member supported by the lever depresses the input button only 1 millimeter. The force required to depress the input button may be, therefore, reduced for users with limited manual strength or dexterity. In other examples, the contact surface may be positioned elsewhere on a lever (e.g., closer to a pivot of the lever) to reduce the distance a user depresses the contact surface to depress the input button.

In at least some embodiments, a movable transmission feature including a lever may allow the adaptive grip and/or the movable transmission feature to be manufactured from a single material and/or in a single additive manufacturing session. A single material and/or a single additive manufacturing session may reduce the manufacturing costs associated with the adaptive grip.

The present disclosure relates to systems and methods for manufacturing at least a part of a peripheral device according to at least the examples provided in the sections below:

[A1] In some embodiments, an adaptive grip for a digital stylus includes a body having an internal volume and a keying feature in the internal volume to rotationally key the digital stylus to the body. The adaptive grip further includes a distal opening to allow an inking tip of the digital stylus to protrude from the internal volume and a retention feature to retain the digital stylus in the internal volume in a longitudinal direction.

[A2] In some embodiments, the adaptive grip of [A1] further includes a window aligned with an input button of the digital stylus based at least partially on the keying feature.

[A3] In some embodiments, the adaptive grip of [A2] further includes a movable transmission feature positioned at least partially in the window.

[A4] In some embodiments, the movable transmission feature of [A3] is integrally formed with a body material of the body.

[A5] In some embodiments, at least a portion of the movable transmission feature of [A3] is connected to the body by an elastic material different from a body material of the body.

[A6] In some embodiments, at least a portion of the movable transmission feature of [A3] is connected to the body by a lever.

[A7] In some embodiments, a contact surface of the movable transmission feature of [A6] is in a different longitudinal position than an input button of the digital stylus.

[A8] In some embodiments, the retention feature of any of [A1] through [A7] is a removable cap configured to be connected to a proximal end of the body opposite the distal opening.

[A9] In some embodiments, the removable cap of [A8] includes the keying feature.

[A10] In some embodiments, the adaptive grip of [A8] further includes a second keying feature configured to key a rotational position of the removable cap to the body when connected to the body.

[A11] In some embodiments, the retention feature of any of [A1] through [A7] is a removable cap configured to be connected to a distal end of the body and includes the distal opening.

[A12] In some embodiments, the adaptive grip of any of [A1] through [A8] further includes an inductive charging transmission coil proximate the internal volume based at least partially on the keying feature.

[A13] In some embodiments, the body of any of [A1] through [A12] includes a first portion and a second portion configured to connect around the digital stylus.

[A14] In some embodiments, the internal volume of the body of any of [A1] through [A12] is configured to receive the digital stylus in a longitudinal direction.

[B1] In some embodiments, a method of manufacturing an adaptive grip for a digital stylus includes obtaining a model of an adaptive grip, the model having a plurality of components including at least a body configured to receive the digital stylus; identifying one or more fit components of the model; identifying one or more functional components of the model; receiving at least one change to the model; based at least partially on the at least one change, changing at least one property of a fit component of the one or more fit components without altering a functional component of the plurality of components; and providing at least an altered fit component to an additive manufacturing device.

[B2] In some embodiments, the at least one property of the fit component of [B1] includes a dimension of the fit component, and the fit component is a subcomponent of the body.

[B3] In some embodiments, the one or more functional components of the model of [B1] includes a movable transmission feature integrally formed with the body, and the method further includes additively manufacturing the body and the movable transmission feature in a single additive manufacturing session.

[C1] In some embodiments, a system for providing inputs to an electronic device includes an adaptive grip and a digital stylus. The adaptive grip includes a body having an internal volume and a keying feature in the internal volume to rotationally key the digital stylus to the body. The adaptive grip further includes a distal opening to allow an inking tip of the digital stylus to protrude from the internal volume and a retention feature to retain the digital stylus in the internal volume in a longitudinal direction. The adaptive grip further includes a movable transmission feature having a contact surface on a transmission member. The digital stylus is positioned in the internal volume of the adaptive grip and includes an input button on a transverse side of the digital stylus, and the input button is rotationally and longitudinally aligned with a portion of the transmission member.

[C2] In some embodiments, the digital stylus of [C1] includes a tail clip, and the tail clip interacts with the keying feature to rotationally key the digital stylus to the adaptive grip.

[C3] In some embodiments, the digital stylus of [C1] includes an electrical connector, and the electrical connector interacts with the keying feature to rotationally key the digital stylus to the adaptive grip.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An adaptive grip for a digital stylus, the adaptive grip comprising:
   a body with a distal end and a proximal end and having an internal volume;
   a distal opening to allow an inking tip of the digital stylus to protrude from the internal volume; and
   a removable cap positioned at the proximal end of the body to fix the digital stylus in the internal volume in a longitudinal direction, wherein the removable cap includes a keying feature configured to interact with at least a portion of the digital stylus to rotationally key the digital stylus to the body.

2. The adaptive grip of claim 1, further comprising a window aligned with an input button of the digital stylus based at least partially on the keying feature.

3. The adaptive grip of claim 2, further comprising a movable transmission feature positioned at least partially in the window.

4. The adaptive grip of claim 3, wherein the movable transmission feature is integrally formed with a body material of the body.

5. The adaptive grip of claim 3, wherein at least a portion of the movable transmission feature is connected to the body by an elastic material different from a body material of the body.

6. The adaptive grip of claim 3, wherein at least a portion of the movable transmission feature is connected to the body by a lever.

7. The adaptive grip of claim 6, wherein a contact surface of the movable transmission feature is in a different longitudinal position than an input button of the digital stylus.

8. The adaptive grip of claim 1, further comprising a second keying feature configured to key a rotational position of the removable cap to the body when connected to the body.

9. The adaptive grip of claim 1, wherein the retention feature is includes a distal removable cap configured to be connected to a distal end of the body and includes the distal opening.

10. The adaptive grip of claim 1, further comprising an inductive charging transmission coil proximate the internal volume based at least partially on the keying feature.

11. The adaptive grip of claim 1, wherein the body includes a first portion and a second portion configured to connect around the digital stylus.

12. The adaptive grip of claim 1, wherein the internal volume of the body is configured to receive the digital stylus in a longitudinal direction.

13. A system for providing inputs to an electronic device, the system comprising:
an adaptive grip including:
a body with a distal end and a proximal end having an internal volume,
a distal opening to allow an inking tip of the digital stylus to protrude from the internal volume,
a removable cap positioned at the proximal end of the body to fix the digital stylus in the internal volume in a longitudinal direction, wherein the removable cap includes a keying feature configured to interact with at least a portion of the digital stylus to rotationally key the digital stylus to the adaptive grip, and
a movable transmission feature having a contact surface on a transmission member; and
a digital stylus positioned in the internal volume, the digital stylus including:
an input button on a transverse side of the digital stylus, wherein the input button is rotationally and longitudinally aligned with a portion of the transmission member.

14. The system of claim 13, wherein the digital stylus includes a tail clip, and the tail clip interacts with the keying feature to rotationally key the digital stylus to the adaptive grip.

15. The system of claim 13, wherein the digital stylus includes an electrical connector, and the electrical connector interacts with the keying feature to rotationally key the digital stylus to the adaptive grip.

* * * * *